US008495637B2

(12) United States Patent
Alambritis

(10) Patent No.: US 8,495,637 B2
(45) Date of Patent: Jul. 23, 2013

(54) APPARATUS AND METHOD FOR TEMPORARILY FREEING UP RESOURCES IN A COMPUTER

(75) Inventor: Stavros George Alambritis, Mansfield (GB)

(73) Assignee: Gzero Limited, Mansfield Woodhouse (GB)

( * ) Notice: Subject to any disclaimer, the term of this patent is extended or adjusted under 35 U.S.C. 154(b) by 661 days.

(21) Appl. No.: 12/705,234

(22) Filed: Feb. 12, 2010

(65) Prior Publication Data

US 2010/0205410 A1 Aug. 12, 2010

(30) Foreign Application Priority Data

Feb. 12, 2009 (GB) .................................. 0902288.0

(51) Int. Cl.
*G06F 9/46* (2006.01)
(52) U.S. Cl.
USPC ........................................... 718/102; 718/107
(58) Field of Classification Search
USPC ......................................... 718/102, 107, 108
See application file for complete search history.

(56) References Cited

U.S. PATENT DOCUMENTS

| 6,012,127 | A  * | 1/2000  | McDonald et al. ........... 711/141 |
| 6,622,299 | B1 * | 9/2003  | Santosuosso et al. ........ 717/127 |
| 6,687,812 | B1 * | 2/2004  | Shimada ....................... 712/230 |
| 6,721,878 | B1 * | 4/2004  | Paul et al. ..................... 712/244 |
| 6,799,283 | B1 * | 9/2004  | Tamai et al. ................. 714/6.12 |
| 6,865,663 | B2 * | 3/2005  | Barry ............................... 712/34 |
| 6,938,254 | B1 * | 8/2005  | Mathur et al. ................ 718/104 |
| 7,017,029 | B2 * | 3/2006  | Barry ........................... 712/205 |
| 7,246,220 | B1 * | 7/2007  | Cheng et al. .................. 712/228 |
| 7,493,478 | B2 * | 2/2009  | Arimilli et al. ............... 712/228 |
| 7,536,536 | B1 * | 5/2009  | Joshi et al. ........................ 713/1 |
| 7,689,749 | B2 * | 3/2010  | Herczog ....................... 710/264 |
| 7,849,298 | B2 * | 12/2010 | Arimilli et al. ............... 712/228 |
| 8,266,692 | B2 * | 9/2012  | Wenzinger et al. ............ 726/22 |
| 2002/0091720 | A1 * | 7/2002 | Liu et al. ....................... 707/203 |
| 2003/0032417 | A1 * | 2/2003 | Minear et al. ................. 455/419 |
| 2004/0030925 | A1 * | 2/2004 | Raheman ...................... 713/201 |
| 2004/0148601 | A1 * | 7/2004 | Kroening ...................... 717/177 |
| 2006/0155967 | A1 * | 7/2006 | Wang et al. ................... 712/219 |
| 2007/0128899 | A1 * | 6/2007 | Mayer ........................... 439/152 |
| 2007/0266320 | A1 * | 11/2007 | Adams et al. ................ 715/700 |
| 2007/0293184 | A1 * | 12/2007 | Nevalainen et al. .......... 455/403 |
| 2008/0288747 | A1 * | 11/2008 | Inglett et al. ................... 712/20 |
| 2009/0013409 | A1 * | 1/2009 | Wenzinger et al. ............ 726/24 |
| 2010/0125850 | A1 * | 5/2010 | Hostettler et al. ............ 718/103 |
| 2011/0082853 | A1 * | 4/2011 | Galai et al. ................... 707/709 |

FOREIGN PATENT DOCUMENTS

| JP | 06214809 A   | 8/1994 |
| JP | 2004040172 A | 2/2004 |

* cited by examiner

*Primary Examiner* — Aimee Li
(74) *Attorney, Agent, or Firm* — Richard M. Goldberg

(57) ABSTRACT

Apparatus for data processing includes a processor, memory and storage. A plurality of sets of instructions, each corresponding to one of a plurality of programs, is stored in the storage. The processor is configured to load the sets of instructions from the storage into the memory, identify a first program as nonessential, close the first program and remove its corresponding set of instructions from the memory, and reload the set of instructions corresponding to the first program into the memory from the storage.

21 Claims, 16 Drawing Sheets

APPARATUS AND METHOD FOR TEMPORARILY FREEING UP RESOURCES IN A COMPUTER

CROSS REFERENCE TO RELATED APPLICATIONS

This application claims priority from United Kingdom Patent Application No. 09 02 288.0, filed 12 Feb. 2009, the whole contents of which are incorporated herein by reference in their entirety.

BACKGROUND OF THE INVENTION

1. Field of the Invention

The present invention relates to a method and apparatus for data processing.

2. Description of the Related Art

Computers of various types, including PCs, laptops, notebooks and tablets from various manufacturers, generally allow a user to multitask by opening several applications and running processes and services in the background. Many of these, particularly the services, take up system memory and prevent the fast running of the computer when using a memory-intensive application, such as an online game or video editing software. It is possible for the user to close some of these processes and services, but without detailed knowledge of the operating system and applications that are running, the user may close down essential programs. Further, once the user has finished with the memory-intensive task it is difficult to restart the closed programs. Usually a reboot of the computer is necessary to reinstate it to its earlier condition.

BRIEF SUMMARY OF THE INVENTION

According to a first aspect of the present invention, there is provided apparatus for data processing comprising a processor, memory and storage, wherein a plurality of sets of instructions, each corresponding to one of a plurality of programs, is stored in said storage and said processor is configured to load said sets of instructions from said storage into said memory; receive a first command to close non-essential programs; identify a first program as non-essential; close said first program and remove its corresponding set of instructions from said memory; receive a second command to re-open non-essential programs; and reload the set of instructions corresponding to said first program into said memory from said to storage.

According to a second aspect of the present invention, there is provided apparatus for data processing, comprising a processor, memory, storage and a network connection, wherein a plurality of sets of instructions, each corresponding to one of a plurality of programs, is stored in said storage and said processor is configured to: load said sets of instructions from said storage into said memory; communicate with a remote server via said network connection to obtain an indication of non-essential programs; receive a first command to close non-essential programs; identify a first program as non-essential; close said first program and remove its corresponding set of instructions from said memory; receive a second command to re-open non-essential programs; and reload the set of instructions corresponding to said first program into said memory from said storage.

According to a third aspect of the present invention, there is provided a method of temporarily freeing up resources in a computer, comprising the steps of: loading a plurality of sets of instructions from storage into memory, thereby starting a plurality of corresponding programs; receiving a command to close non-essential programs; identifying a first program as nonessential; closing said first program and removing its corresponding set of instructions from memory; receiving a second command to re-open non-essential programs; and reloading the set of instructions corresponding to said first program into memory from storage.

According to a fourth aspect of the invention, there is provided a computer-readable medium having computer-readable instructions executable by a computer such that, when executing said instructions, a computer will perform the steps of: storing a plurality of sets of instructions, each corresponding to one of a plurality of programs; loading said sets of instructions from storage into memory; receiving a first command to close non-essential programs; identifying a first program as non-essential; closing said first program and removing its corresponding set of instructions from said memory; receiving a second command to re-open non-essential programs; and reloading the set of instructions corresponding to said first program into memory from storage.

According to a fifth aspect of the present invention, there is provided apparatus for data processing, comprising a processor, memory, storage and a display, wherein a plurality of sets of instructions, each corresponding to one of a plurality of programs, is stored in said storage, and each set of instructions may be loaded into memory in order to create a running program, and said processor is configured to: identify how many programs are running and thereby calculate a first variable; identify how many of said running programs are non-essential and thereby calculate a second variable; calculate an efficiency indication in dependence upon said first and second variables; and display said efficiency indication on said display.

DESCRIPTION OF THE BEST MODE FOR CARRYING OUT THE INVENTION

FIG. 1

Figure 1:
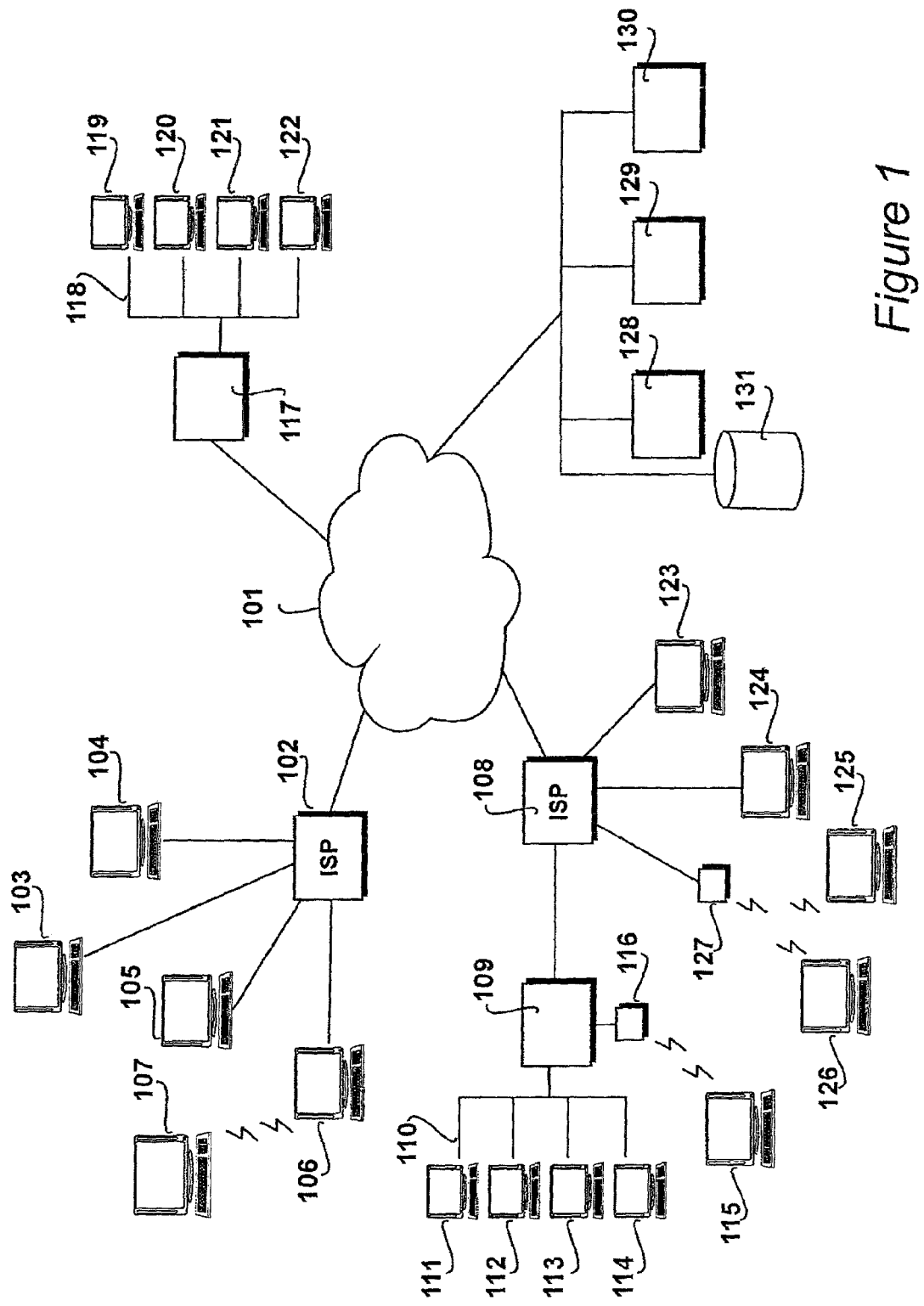
FIG. 1 shows a networked environment.

The Internet 101 connects various computer systems and networks around the world. Several ways of connecting are shown in FIG. 1. Internet Service Provider (ISP) 102 is connected to computers 103, 104, 105 and 106. Computer 107 is wirelessly connected on an ad-hoc basis to computer 106. ISP 108 connects server 109 to the Internet 101. Server 109 is part of a wired LAN 110 which connects computers 111, 112, 113 and 114. In addition, computer 115 is wirelessly connected to server 109 via a wireless access point 116. Web server 117 connects directly to the internet 101 and provides a LAN 118 that connects computers 119, 120, 121 and 122. Computers 123 and 124 are connected to the internet via ISP 108, while computers 125 and 126 are connected via wireless modem/router 127 which is also connected to the internet via ISP 108.

In addition, a network comprising three remote servers 128, 129 and 130 and a database server 131 are connected to Internet 101.

Other methods of connecting computer systems such as servers, personal computers and laptops to the internet, both wired and wirelessly, are possible.

FIG. 2

Figure 2:
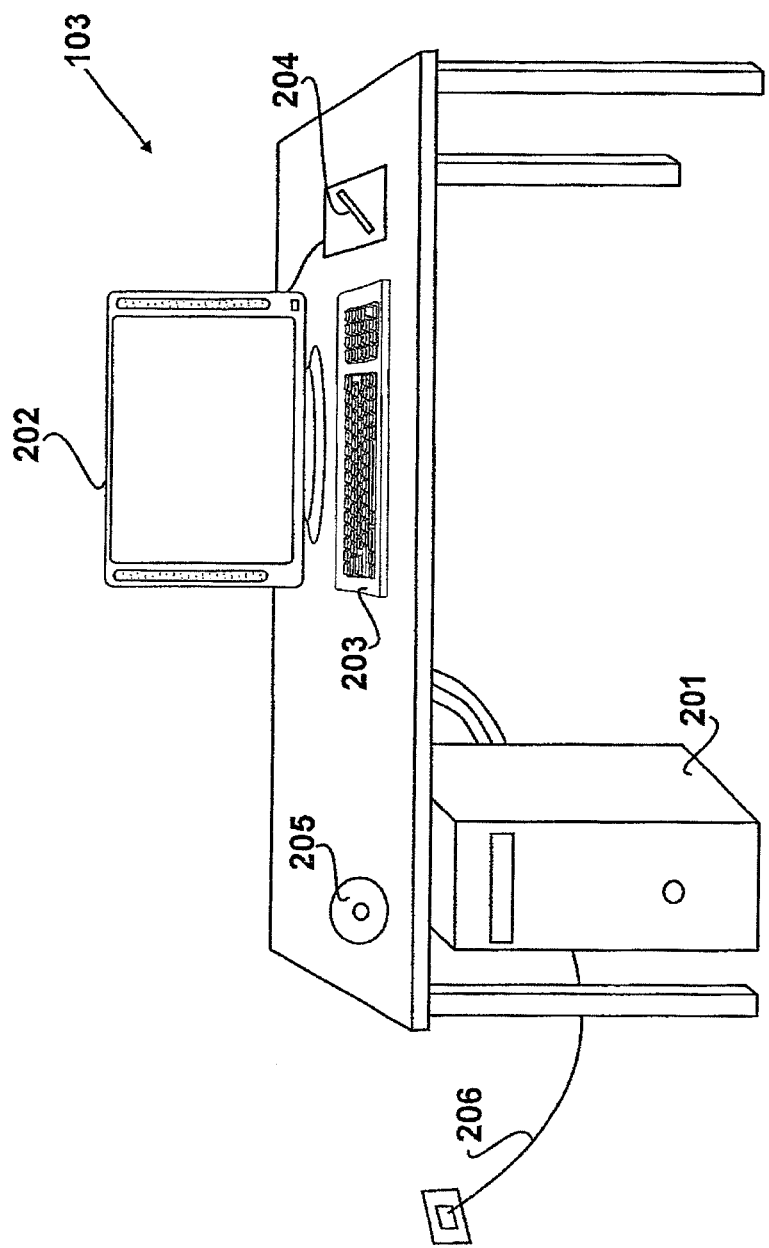
FIG. 2 illustrates a computer shown in FIG. 1.

FIG. 2 illustrates computer 103. It includes a processing system 201 that supplies image signals to a widescreen video display unit (VDU) 202. The operator controls the processing system 201 by means of a keyboard 203 and a mouse 204. Other manual input devices, such as game controllers, may also be used.

Instructions controlling the processing system 201 may be installed from a physical medium such as a CD-ROM disk 205, or over a network via network cable 206. These instructions enable the processing system 201 to interpret user commands from the keyboard 203 and the mouse 204 such that data may be viewed, edited and processed.

Other computers shown in FIG. 1, and other computers suitable for use with the invention, also have some form of processing system, display, means of connecting to and communicating with a network, and means of providing manual input, although they may not be as shown in FIG. 2.

FIG. 3

Figure 3:
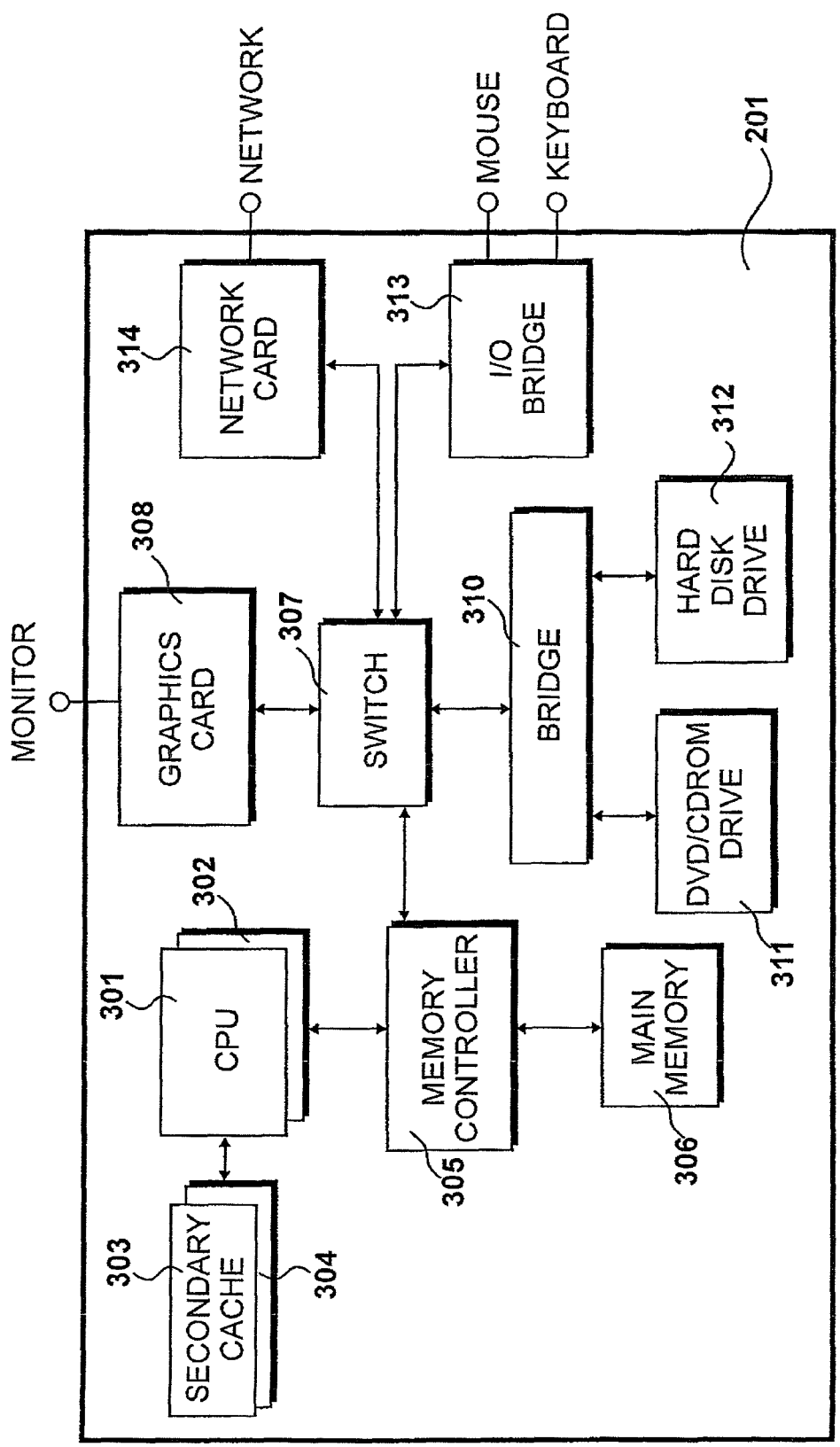
FIG. 3 shows a processing system illustrated in FIG. 2.

The processing system 201 shown in FIG. 2 is detailed in FIG. 3. The processing system comprises two central processing units (CPUs) 301 and 302 operating in parallel. Each of these CPUs 301 and 302 has a dedicated secondary cache memory 303 and 304 that facilitates per-CPU storage of frequently used instructions and data. Each CPU 301 and 302 further includes separate primary instruction and data cache memory circuits on the same chip, thereby facilitating a further level of processing improvement. A memory controller 305 provides a common connection between the CPUs 301 and 302 and main memory 306. The main memory 306 comprises two gigabytes of dynamic RAM.

The memory controller 305 further facilitates connectivity between the aforementioned components of the processing system 201 and a high bandwidth non-blocking crossbar switch 307. The switch makes it possible to provide a direct high capacity connection between any of several attached circuits. These include a graphics card 308. The graphics card 308 generally receives instructions from the CPUs 301 and 302 to perform various types of graphical image rendering processes, resulting in images, clips and scenes being rendered in real time on the monitor 202.

A second SCSI bridge 310 facilitates connection between the crossbar switch 307 and a DVD/CD-ROM drive 311. The CD-ROM drive provides a convenient way of receiving large quantities of instructions and data, and is typically used to install instructions for the processing system 201 onto a hard disk drive 312. Once installed, instructions located on the hard disk drive 312 may be loaded into main memory 306 and then executed by the CPUs 301 and 302. An input/output bridge 313 provides an interface for the mouse 204 and the keyboard 203, through which the user is able to provide instructions to the processing system 201. A network communication means is provided by an Ethernet card 314. However, other network connections may be used, which may use wired, wireless or telephonic methods, or some other methods of communication.

Other types of processing systems that include some form of processor, memory and storage could be used. Alternatively, computers having different processing systems but including a processor, memory and storage would also be suitable; for example, the storage or the memory could be external to the processing system.

FIG. 4

A computer such as computer 103 may be used for a variety of purposes. In order to run software applications that the user can interact with, the computer runs tasks such as processes and services. Each task uses up resources such as memory, CPU clock cycle time, hard drive storage space, network bandwidth, and so on. Some software applications, such as word processing, playing simple non-networked games or viewing photographs, do not use a large amount of resources. Others, such as playing music, editing images and browsing the Internet, use a larger amount of resources. Applications that are very resource-intensive include online role-playing games, video editing, rendering animations, and so on.

Each application is started by an executable file, called a process. In addition, many processes and services run in the background and are not obvious to the user. At any one time, a large number of tasks may be running.

Instructions for most programs carried out by computer 103, including the operating system, services and processes, are stored on hard drive 312. When a program is started, the relevant instructions are copied into main memory 306 so that they can be accessed by the CPUs 301 and 302. This is known as loading to memory. Generally not all the instructions or data are loaded at first, only those that are immediately required. As the program is carried out, other instructions and data may be loaded into memory and some may be removed.

Figure 4:
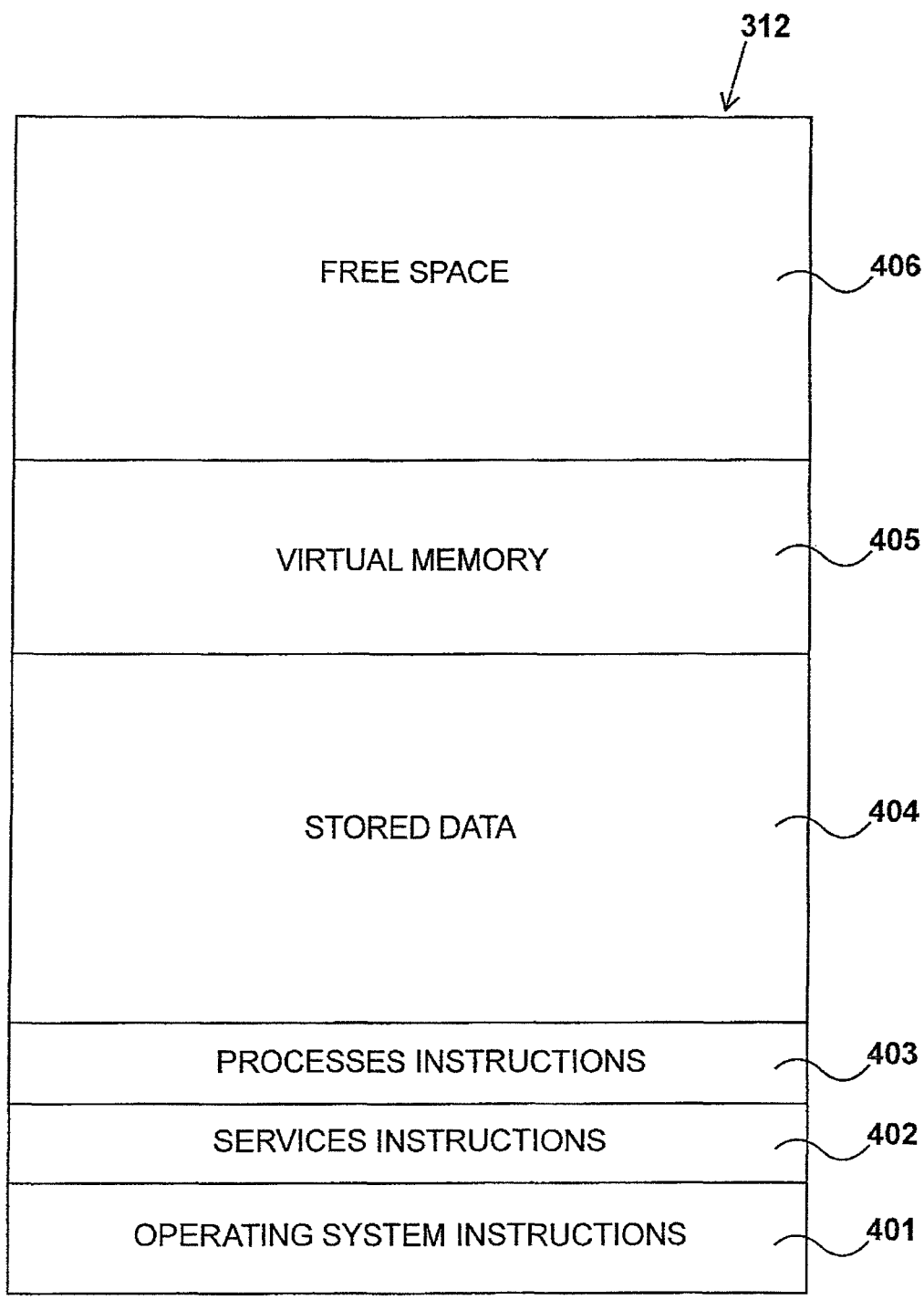
FIG. 4 shows the contents of a hard disk drive shown in FIG. 3.

FIG. 4 illustrates the contents of hard disk drive 312. They include operating system instructions 401, services instructions 402 and processes instructions 403. Operating system instructions 401 are loaded whenever the computer 103 is started. The operating system is responsible for the running of the computer once it has fully loaded. When a program such as a service or a process is started, the operating system finds the corresponding executable file, loads it into memory and executes it. Other processes and services may then be started by that program.

Some service instructions 402 are loaded as soon as the operating system has initialised, and others are loaded later or never. Services are programs that run transparently to a user and do not require user intervention. They may be associated with the operating system, with an application or standalone. For example, the operating system runs services that manage memory, perform networking tasks, allow the installation of new programs, and so on.

Processes are programs that may require user intervention and therefore have a user interface of some kind. Some are run by the operating system, but many processes are associated with applications. Therefore, process instructions 403 may be loaded into memory at startup, when a user starts an application, when an application starts an extra process, or at some other time. For example, a music-playing application may have several processes: in addition to the process that actually starts the application, there may be an update scheduler service and a device detector service that are loaded at startup and run all the time, plus a process that runs in the background while the application is running to monitor the contents of the hard drive.

The division between processes and services can be arbitrary and therefore the word tasks is used herein to cover both processes and services. Some operating systems do not make the distinction, and some may make use of a further type of task. Therefore, for the purposes of this document the term "program" is used, defined as a piece of software that has an executable file or set of instructions which can be loaded into memory and removed from memory, and which can be executed by a processor.

Much of hard drive 312 is taken up by data 404, which is stored by the user in the form of files or stored transparently by the operating system or processes. A certain amount of space, which can be altered by the operating system or by the user, is set aside for virtual memory 405. The remaining hard drive space is free space 406.

FIG. 5

Figure 5:
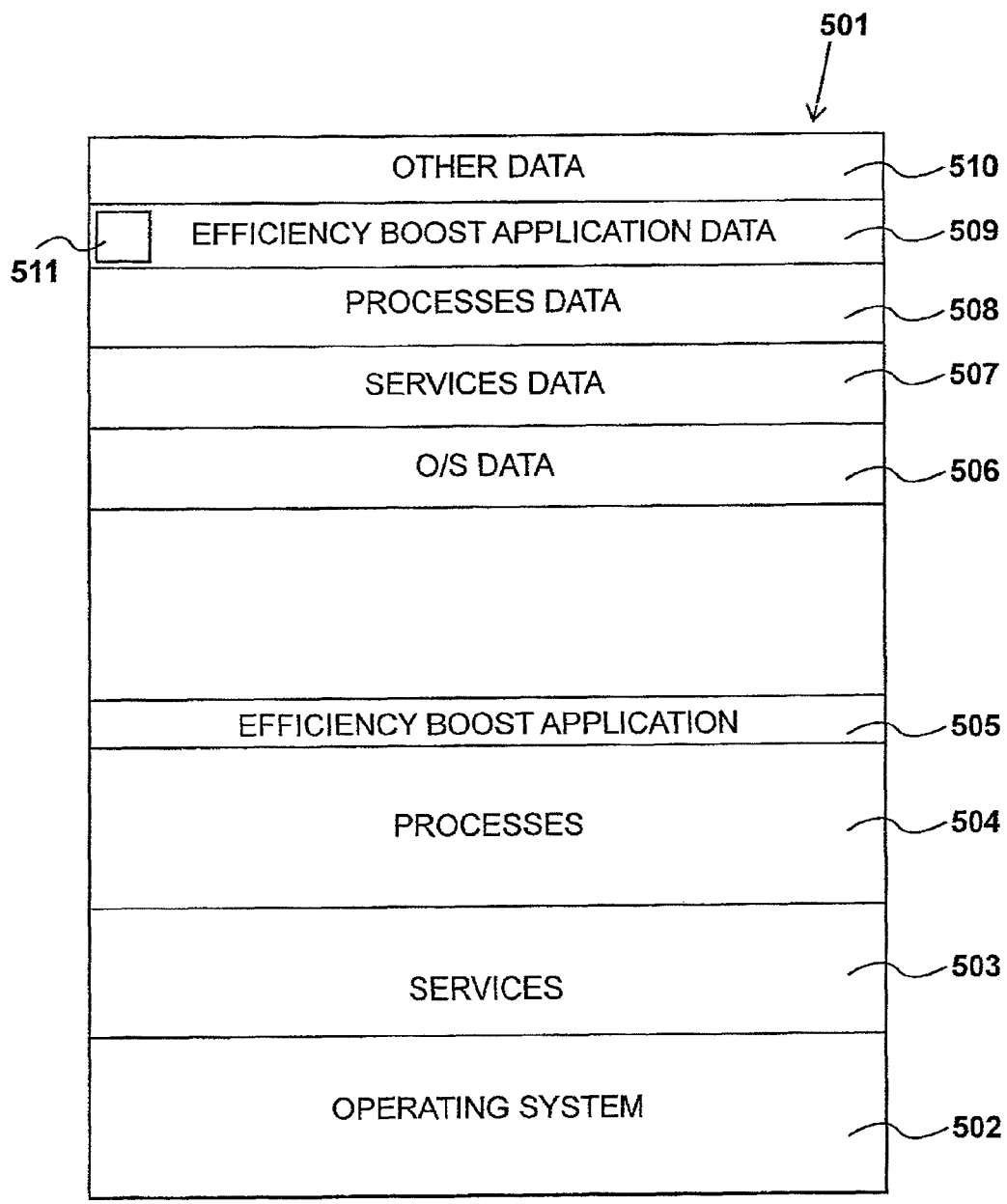
FIG. 5 shows the contents of the memory of the processing system shown in FIG. 3.
Figure 6:
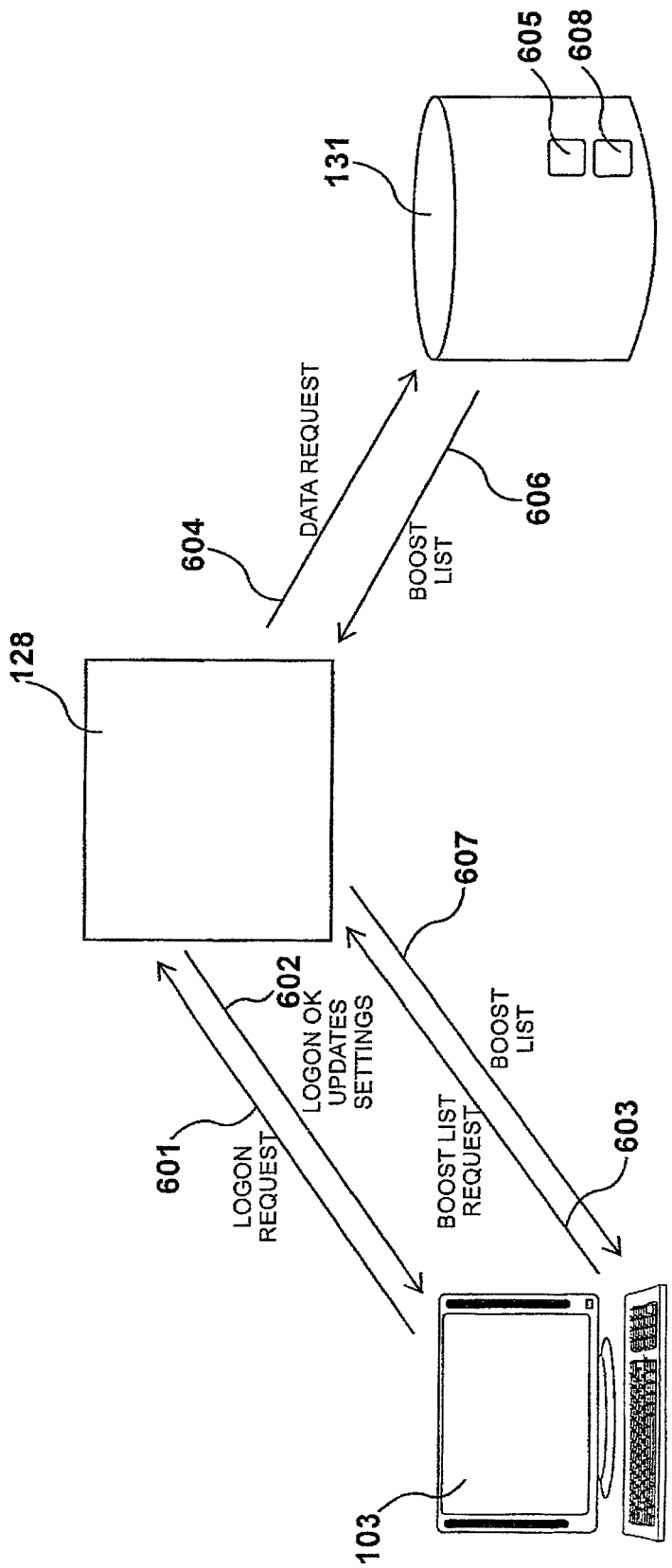
FIG. 6 shows a diagram of communication between computing devices shown in FIG. 1.

FIG. 5 illustrates the instructions and data present in memory 501. Memory 501 comprises the caches 303 and 304, main memory 306 and virtual memory 405. At any time any of the instructions and data could be stored in any of these locations.

Memory 501 therefore includes operating system 502, loaded from operating system instructions 401, services 503, loaded from services instructions 402, and processes 504, loaded from processes instructions 403. In particular, the process running efficiency boost application 505 is loaded at the startup of computer 103 in order to be available to boost the efficiency of the computer at any time.

Memory 501 also includes data for immediate access, including data 506 required by operating system 502, data 507 required by services 503, data 508 required by processes 504, including data 509 required by efficiency application 505, and other data 510. When a program is stopped its instructions and data are purged from memory 501. If data has not been saved to hard drive 312 first, it is lost.

Thus, in order to free up resources, including memory, processes and services must be stopped so that their instructions and data are removed from memory 501. The user can do this manually but often a user is not knowledgeable enough to remove every program that can be removed. Operating systems generally have a large number of background services, some of which are essential for the functioning of the operating system, some of which are non-essential, and some of which are dependent upon the state of the computer—for example a firewall is only essential if a computer is networked. Some programs need never run while some should only be stopped temporarily. While it is easy to close applications, only a very experienced user should stop other programs.

Data 509 required by efficiency application 505 includes a local boost table 511. This is a list of programs that are or have been running on computer 103, together with an indication of whether they are essential or non-essential. Table 511 is used by efficiency application 505 to choose programs to stop when the user requests an efficiency boost.

Further, when the user has finished a memory-intensive application he may wish for all the stopped programs to be turned back on again. They may have been non-essential, but they may have a purpose. For example, the user might stop a scheduler in order to stop it running during the memory-intensive task, but he will want it to run at another time. Therefore to restore the computer to the way it was before all the programs were stopped, the user would have to restart the computer and restart the required programs. Efficiency application 505, upon the user's request, restarts all the stopped programs.

In addition, many computers experience problems with spyware and malware that can take up a large amount of memory. Anti-virus software is not always effective in removing these. It would be preferable if, once these programs were stopped, they were not restarted. Efficiency application 505 can alert the user that certain programs should not be restarted, and seek input before restarting them.

FIG. 6

The speed and efficiency of computer 103 is dependent upon the usage of several resources, in particular CPU clock time, available memory, available network bandwidth and hard drive space.

CPUs 301 and 302 can perform a set number of operations per second. A faster processor can perform more operations per second. Each CPU cycles through its allocated programs, performing one or more operation at a time from each program. Therefore, if too many programs are running all of them are slowed, not just the last one to be started.

Many programs access the internet, such as application updates, background download managers and viral software. If the user wishes to use an application that needs to access the internet quickly, then another program that is taking up a lot of network bandwidth can cause slowness.

The amount of available memory greatly affects computer efficiency. The memory 401 available to CPUs 301 and 302 includes first their own caches 303 and 304 respectively, then RAM 306, and finally virtual memory 405 on hard drive 312. Instructions and data required for a task that is being currently used are kept in RAM 306. Instructions and data likely to be needed soon by a CPU are pre-emptively loaded into the corresponding cache. When RAM 306 starts to fill up, instructions and data for tasks that have not been used in a while are written to virtual memory 405. When one of these tasks is switched to, those instructions and data are written back to RAM 306 in order that they can be accessed quickly. This can be efficient if the RAM is large enough, but constant swapping of data between RAM and virtual memory takes up a lot of CPU time. Also, if the hard drive is being accessed by another program, this swapping takes longer.

If the amount of memory needed by the processes and services running on the processing system approaches the total available memory then the computer will run noticeably slower, possibly seizing up altogether. Many operating systems will automatically increase the amount of virtual memory when this occurs, but this does not solve the problem if there is not enough RAM for all the running programs.

The use of resources by unnecessary tasks, both constantly and at unexpected times, can be an annoyance to a user. For example, the user of computer 103 is playing a game over the Internet with the user of computer 119, in which each user controls a character and the characters are fighting. The user of computer 119 provides manual input indicating movement of his character. This movement is provided to computer 103. If computer 103 does not display this movement fast enough, then the user of computer 103 may lose the game. This can be extremely frustrating, and even a computer that has a large amount of RAM can suffer from this problem. For example, a computer may be running at a speed acceptable to the user and then a background service such as a scheduled update starts, using up CPU clock time, memory and network bandwidth, and also writing to the hard drive, thus instantly slowing the computer.

A user may also find the over-consumption of resources frustrating when using other resource-intensive programs, such as rendering or video editing. However, a user may simply wish to speed the computer up for day-to-day operation.

Efficiency application 505 addresses these issues. When the user of computer 103 wishes to boost the efficiency of the computer by removing non-essential programs from memory, he can request efficiency application 505 to perform an efficiency boost.

When application 505 starts up, it may operate as a standalone application, even if computer 103 is offline. In this case, the application runs in the background until the user requests an efficiency boost, at which point the current boost table 511 is accessed to indicate the list of programs to close down.

Alternatively, it communicates with one of remote servers 128, 129 or 130, shown in this example as server 128, and sends a logon request. Server 128 approves the logon and sends updates and settings 602 back to computer 103. This includes updating the boost list as follows.

Application 505 sends a boost list request 603 to server 128, which includes a list of programs running on computer 103 that are not already listed in boost table 511. The first time this runs, the boost table will be empty and all running programs will be included in the request.

Server 128 then sends a data request 604 to database server 131. Database server 131 queries a programs database 605 held in its storage and returns a boost list 606 to remote server 128. This lists those of the queried programs that are considered to be non-essential. It also lists programs for which a status has already been provided to computer 103, but whose status has changed. Server 128 sends this as boost list 607 to computer 103, and application 505 then uses this list to update local boost table 511. The application then runs in the background until the user requests an efficiency boost, at which point the updated boost table 511 is accessed to indicate the list of programs to close down.

Thus database load and network traffic is minimised, since computer 103 only enquires once about each program it runs. Also, computer 103 is able to run efficiency application 505 when offline.

In alternative embodiments, a locally-held boost table may simply list a large number of programs, any of which may or may not be running on computer 103, along with a status of essential or non-essential. Server 128 would periodically query database server 131 and send an updated list to all networked computers, which would either replace the local boost tables or be used to update them. This is not a preferred embodiment, however, as each local boost table would be large, and keeping them up-to-date would generate a large amount of database load and network traffic.

The user may, at any time subsequent to an efficiency boost, request application 505 to restore the computer, and application 505 will then restart the stopped programs. Application 505 can flag to the user that one or more of the stopped programs is known to be a malicious program such as spyware, and ask whether it should be restarted.

Programs database 605 includes a list of services and a list of processes. For each program, an indication of operating system and a status tag is included. The status tag indicates whether the program should be stopped, should not generally be stopped, or should never be stopped. Thus it indicates whether programs are non-essential or not. Other information may also be stored, for example whether a program is considered to be malicious. This information may be included in the boost list 606.

Programs database 605 may be populated manually or automatically. Generally, a decision needs to be made by a knowledgeable person as to the status of a program, but it is possible that the task could be automated.

Remote server 128, like servers 129 and 130, runs a service that sets up and maintains sessions for each logged on computer. This provides a barrier between the database server 131 and the user computers. Several remote servers can access a single database server, but database server 131 could be duplicated as many times as necessary.

Logon request 601 may be a logon as a guest or as a named user. A named user can have settings stored in user database 608 on database server 131, in which case remote server 128 queries that server before returning the logon approval 602. User settings may include user details such as name and address, a list of programs that the user has indicated should be stopped or not stopped regardless of the boost list, the fact that a user has subscribed and no longer sees adverts, and so on. In this embodiment these user settings are saved on database 608 rather than on the user's machines. This is so that if the user replaces his computer or has to reformat the computer due to a catastrophic error the settings are not lost.

User database 608 includes a query history for each user. This history records, for each user, the programs that have been the subject of boost list requests. This allows local boost tables to be updated when an already-queried program has its status changed. The user database may also include information regarding which programs are running at any time on networked computers. This information may need to be collected anonymously and would be submitted to database server 131 along with data request 604.

FIG. 7

Figure 7:
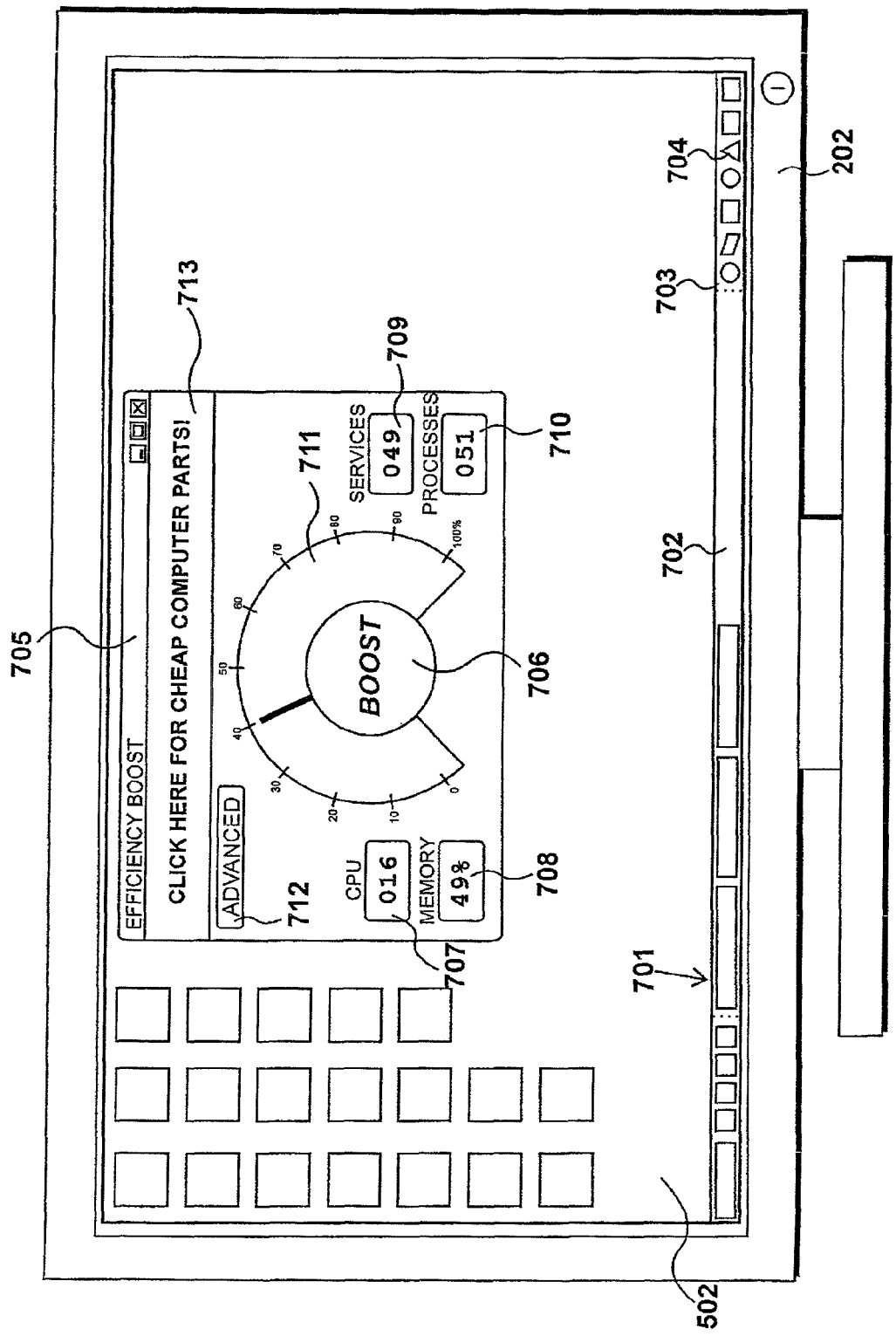
FIG. 7 shows a simple interface of an application shown in FIG. 5.

Display 202 of computer 103 is illustrated in FIG. 7. The user interface of operating system 502 is shown, including a taskbar 701 that includes applications icons 702 representing running applications and processes icons 703 representing background processes that are running. Typically, the process for efficiency application 505 is loaded into memory at start-up of computer 103, allowing the logon process to take place before the user needs the application. This is particularly useful if the application needs to be updated. Process icon 704 is then displayed. When the user wishes to use application 505, he switches to it by clicking on icon 704.

Alternatively, the process for efficiency application 505 may not be loaded until the user so requests by issuing a command to run the application, for example by clicking on an icon on the desktop or in a menu. In this case, the logon screen is displayed at this stage. In either case, once the user is logged on and indicates that he wishes to use efficiency application 505, computer 103 displays user interface 705 of application 505.

Interface 705 includes a button 706 labelled "BOOST", CPU counter 707, memory counter 708, services counter 709, processes counter 710, resources gauge 711 and a button 712 labelled "ADVANCED". In its simplest form, available to users logged on to a remote server as a guest, counters 707 to 710, gauge 711 and button 712 are greyed out, leaving only button 706 available. Clicking on button 706 will cause application 505 to obtain a list of non-essential programs and stop them, after which the text of button 706 changes to "RESTORE". At this point, clicking on button 706 will cause application 505 to restart the stopped tasks.

A registered user has full functionality, including counters 707 to 710, gauge 711 and button 712. Counters 707 to 710 give a numerical indication of, respectively, the CPU usage, the memory usage, the number of running services and the number of running processes. Gauge 711 combines some or all of this information to provide an efficiency indication, ie an overall indication of how effective the efficiency boost has been.

Figure 8:
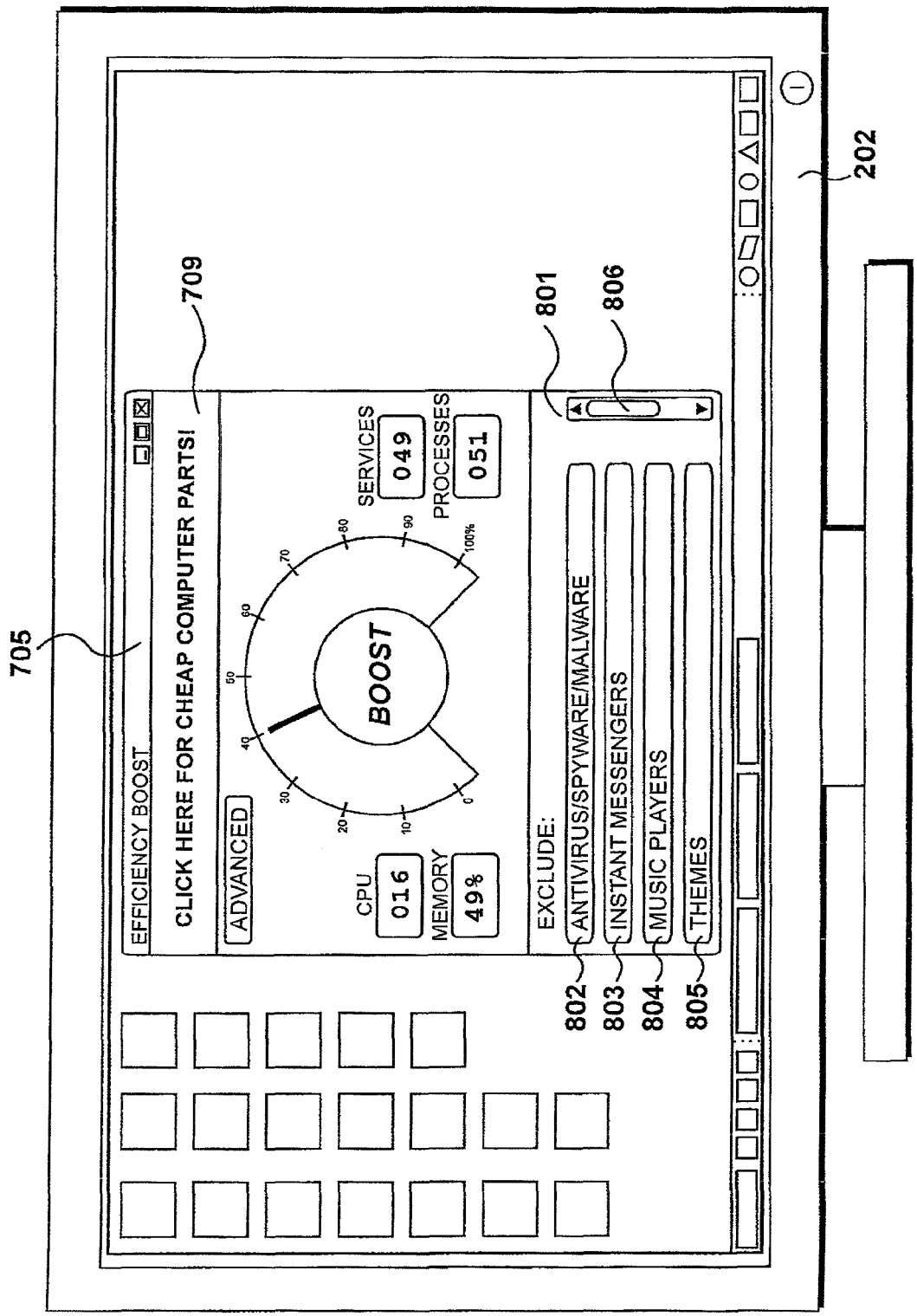
FIG. 8 shows an advanced version of the interface shown in FIG. 7.

If the user clicks on button 712 then an advanced section drops down as shown in FIG. 8.

Interface 705 further includes banner section 713 that is used to display an advertisement. Optionally, a user may choose to subscribe to the service in order to remove advertisements.

FIG. 8

If a registered user clicks on button 712, marked "ADVANCED", then section 801 of interface 705 drops down, allowing the user more control over the efficiency application. This section contains a number of buttons such as buttons 802, 803, 804 and 805, labelled antivirus/spyware/malware, instant messengers, music players and themes respectively. Using these buttons, the user may specify that certain categories of task should not be stopped in order to boost the resources of the computer. Therefore, if the user wishes to prevent the efficiency application from stopping antivirus software, for example, he depresses button 802. The state of the buttons is persistent. By moving scroll bar 806 the user can access more buttons.

These advanced settings are only available in this embodiment if the user logs on as a named user, since user settings are saved remotely in database 608. However, in other embodiments settings could be saved locally, allowing a user to log on as a guest and still use the advanced settings. Alternatively, a guest user would be permitted to access the settings but they would not be saved for the next use of the application.

Information stored about registered users in users database 608 may be used to select advertisements for banner section 709 to which they are more likely to respond.

Other embodiments of interface 705 may contain other buttons and displays, and in other embodiments unregistered users could access some or all of the functions.

FIG. 9

Figure 9:
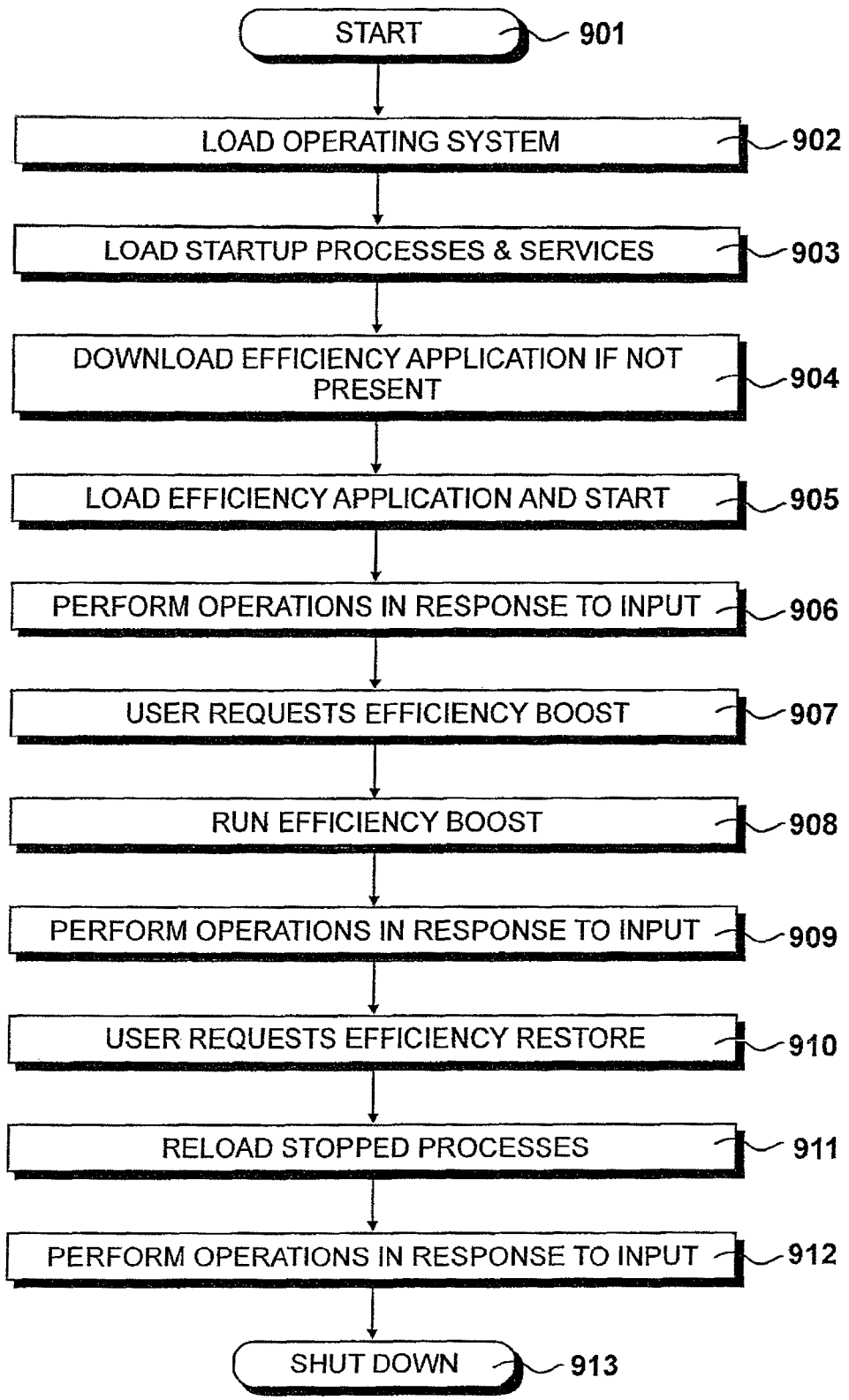
FIG. 9 details steps carried out by the processing system shown in FIG. 2 to process data.

Steps carried out by processing system 201 of computer 103 are detailed in FIG. 9. Each computer shown in FIG. 1 and others suitable for the invention will follow a similar procedure.

At step 901 the computer is switched on and at step 902 the operating system is loaded into memory. Various operating systems are available, some more suitable for certain computing devices than others, and it is envisaged that the invention will be suitable for any of them. At step 903 processes and services that are set up to start with the operating system are loaded into memory. For each one, the operating system finds the executable file on hard drive 312, loads it into memory 501 and executes at least the first line of the file. Subsequently, the executable file takes over.

Figure 10:
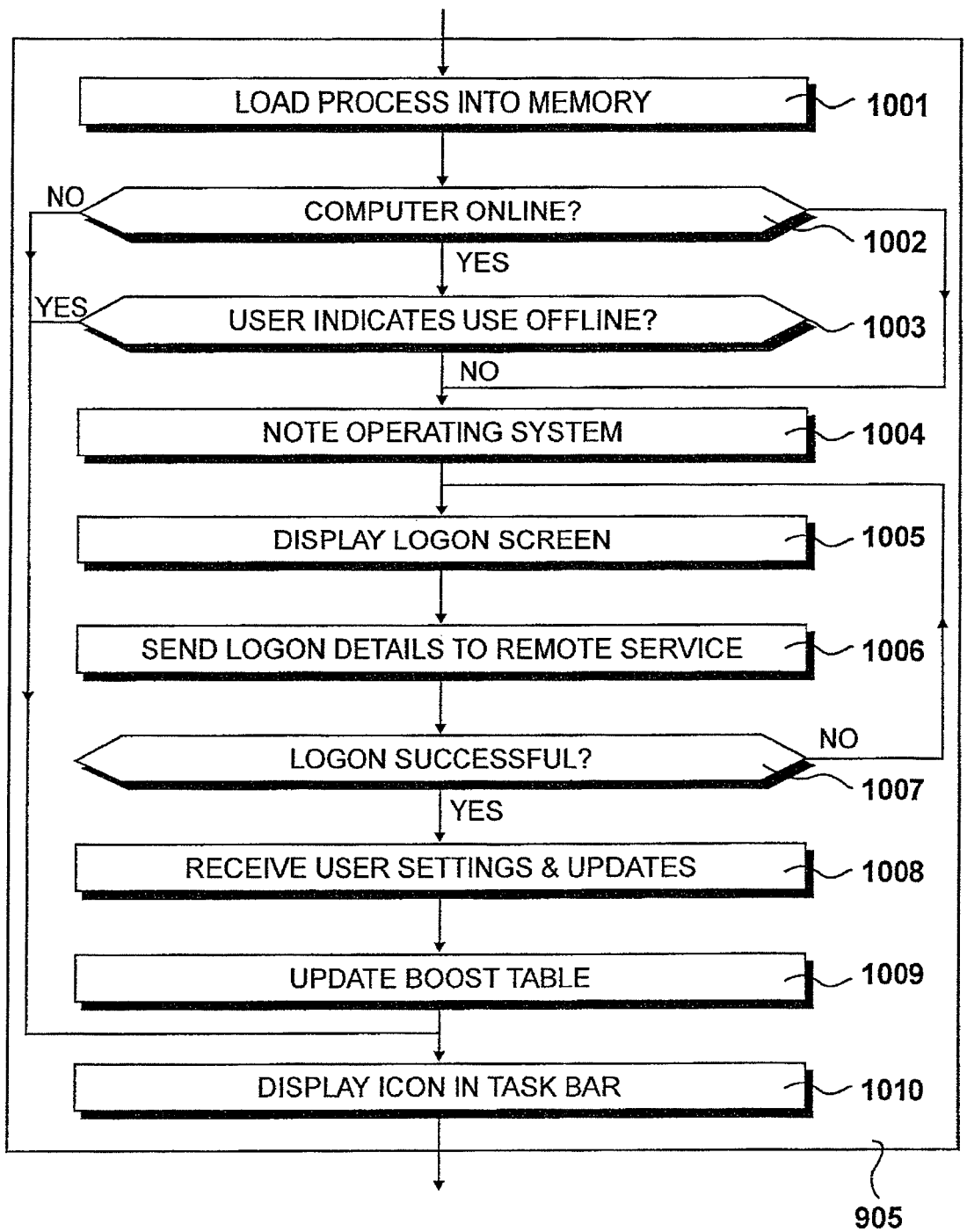
FIG. 10 details steps carried out in FIG. 9 to start an application shown in FIG. 5.

At step 904 efficiency application 505 is downloaded from the internet 101 if it is not already installed on computer 103, and at step 905 its process is loaded into memory, as will be detailed further in FIG. 10.

At step 906 the processing system performs operations in response to user input, including background processes and services that keep the computer working. At step 907 the user requests an efficiency boost by switching to efficiency application 505 and pressing button 706. At step 908 an efficiency boost is performed, as will be described with reference to FIG. 10. The processing system then continues to operate in response to user input at step 909. However, fewer background processes and services will be running, enabling the user's chosen programs to run more quickly and fluidly, with more of the computer's resources available.

At step 910 the user requests a restore by switching to efficiency application 505 and pressing button 706. Efficiency application 505 then reloads stopped programs into memory, as will be detailed further with respect to FIG. 13. The processing system then continues to perform tasks in response to user input at step 912. The original number of background processes and services will be running, meaning that the computer is running in its original state.

At step 913 the computer is shut down by the user, entailing unloading all processes and services and finally unloading the operating system.

FIG. 10

FIG. 10 details step 905 at which efficiency application 505 is started. At step 1001 the process for the application is loaded into memory and at step 1002 a question is asked as to whether computer 103 is connected to the Internet 101, or 'online'. If this question is answered in the affirmative then at step 1003 a further question is asked as to whether there is a user indication, for example a stored user preference or manual input from the user, that the application should run offline. If this question is answered in the affirmative, or if the question asked at step 1001 is answered in the negative, then the steps steps detailed below are skipped, and control is directed to step 1010.

Alternatively, if the question asked at step 1003 is answered in the affirmative, indicating that the computer is online and the user wishes the efficiency application to work online, then at step 1004 the operating system run by the computer is noted and at step 1005 a logon screen is displayed to the user. At step 1006 a logon request 601 is sent to a service hosted by one of remote servers 128, 129 or 130. The request includes input received from the user, which may be a username and password or may be a request to log on as a guest, the version number of the efficiency application running, and an indication of the operating system.

At step 1007 a question is asked as to whether the logon was successful, ie whether a logon approval 602 was received. If this question is answered in the negative then control is returned to step 1005 and the logon screen is redisplayed. Procedures are available at this stage for registering a user, reminding a user of a lost password, and other similar tasks.

If the question asked at step 1007 is answered in the affirmative, to the effect that logon has been completed, then at step 1008 user settings and updates are received from the remote server and implemented. Typically, an update may comprise a newer version of the application, if there is one available for the indicated operating system. Installing a new version may necessitate restarting the application at step 1001, but in this case logon details are not re-requested. At step 1009 the local boost table 511 is updated, as will be described further with respect to FIG. 11.

At step 1010 icon 704 is added to section 703 of taskbar 701 and the efficiency application is ready to use whenever the user requires it.

FIG. 11

Figure 11:
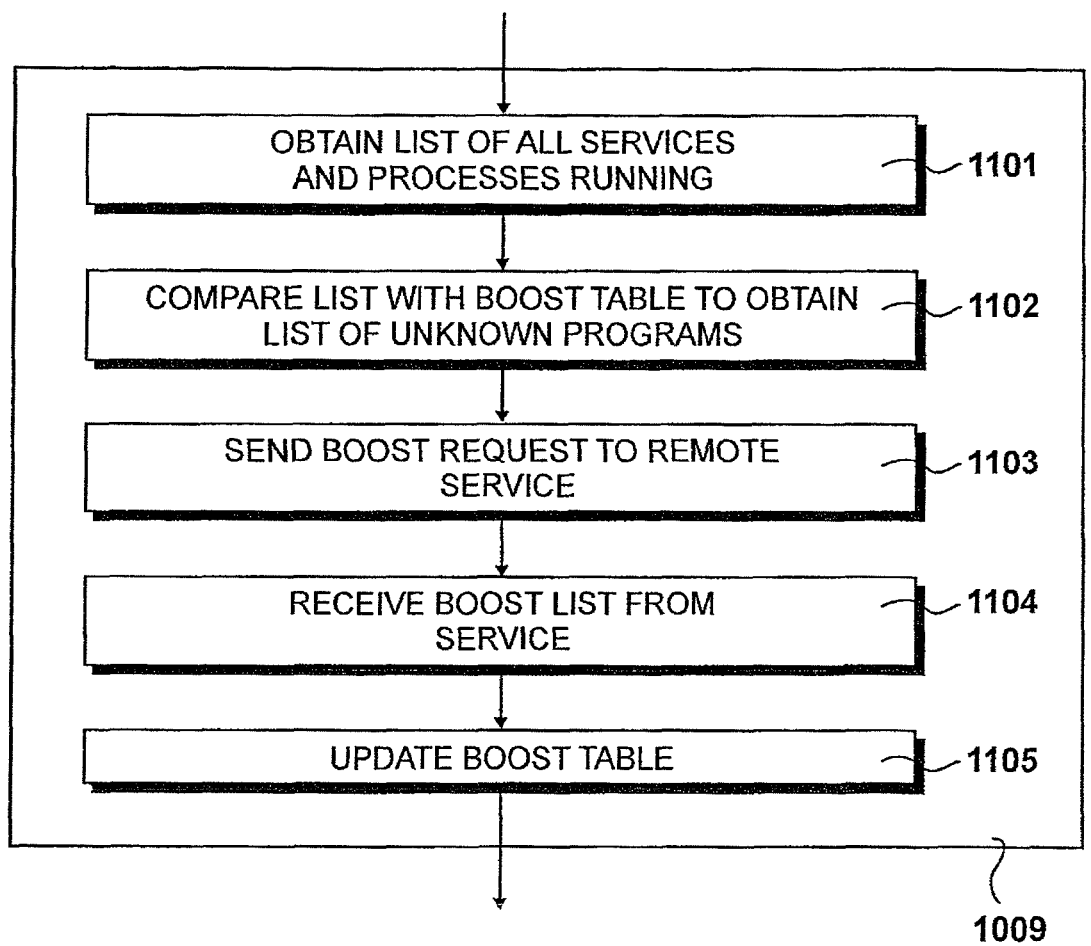
FIG. 11 details steps carried out in FIG. 10 to update a boost table shown in FIG. 5.

Step 1009 at which boost table 511 is updated is detailed in FIG. 11. At step 1101 a list of all processes and services that are running is obtained by interrogating operating system data 506, and at step 1102 this list is compared with boost table 511 to determine whether any running programs are not listed in boost table 511. If so, these are identified as unknown programs. At step 1103 a boost list request 603 is sent to the remote server with which the application is logged on. This request includes an indication of the operating system and a list of any unknown programs identified at step 1102.

At step 1104 a boost list 607 is received from the remote server. The procedure by which the remote server obtains this list is discussed with respect to FIG. 12. This comprises a list of updates to be made to boost table 511. If any unknown programs were sent with the boost list request, then a status of essential or non-essential is provided for each one, unless it is unknown to database server 131 in which case no status is provided. In addition, updates may be provided to the status of one or more programs already listed in boost table 511. For each program, further information may be provided and stored in boost table 511.

Thus at the end of this step, computer 103 holds an up-to-date list of all running programs, with each marked either as boostable (non-essential) or non-boostable (essential). In alternative embodiments, the boost table may comprise for example only non-essential programs, rather than both essential and non-essential programs.

It is also possible for the above steps, carried out in this embodiment immediately following logon, to be carried out when the user requests an efficiency boost. However, this might slow down the boost process.

Alternative methods of keeping boost table 511 up-to-date are envisaged. For example, the boost request could include a list of all the programs running on computer 103 and the boost list could include only non-essential programs that are actually running, allowing the boost table to be updated. However, the described embodiment puts least strain on the database servers by using the simplest query.

In alternative embodiments, no local boost table is kept. In these embodiments, a computer must obtain a new boost list from a networked server every time the efficiency application is run. This could be done, for example, by requesting the database's entire list of programs, by sending a list of running programs that can be used to query the database and returned with each program marked as boostable or non-boostable, or by some other means. This type of embodiment has the advantage of ensuring the security of the boost list, since no local copy is kept to be corrupted or copied, but increases database load and network traffic.

FIG. 12

Figure 12:
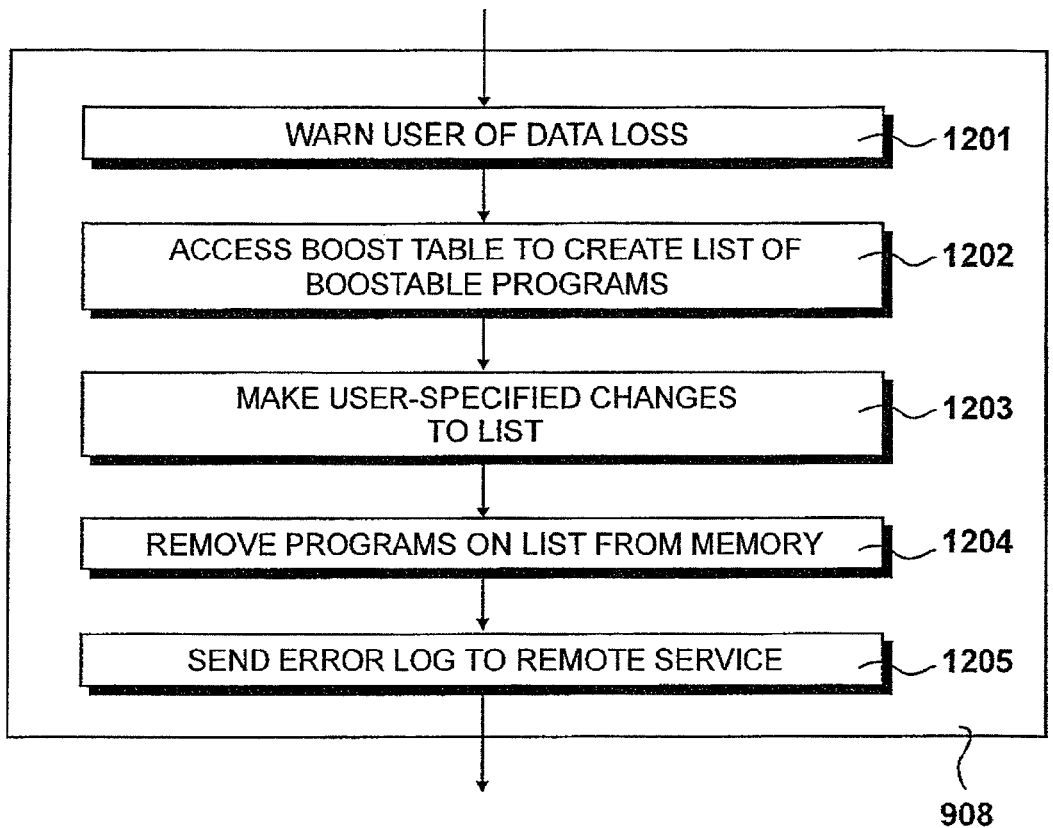
FIG. 12 details steps carried out in FIG. 9 to perform an efficiency boost.

Step 908, at which an efficiency boost is performed, is detailed in FIG. 12. At step 1201 the user is warned that data loss may occur through use of the efficiency application. Generally, processes belonging to applications are considered non-essential. If the user does not save any data being worked on then it will be lost. However, the user does not need to actually close the applications.

At step 1202 boost table 511 is accessed to determine a list of boostable programs. This is obtained by listing all the programs that are marked in boost table 511 as boostable. At step 1203 changes are made to the list as specified in the user settings. For example, as described in FIG. 8, the user may have indicated that programs relating to anti-virus software are not to be closed.

Figure 13:
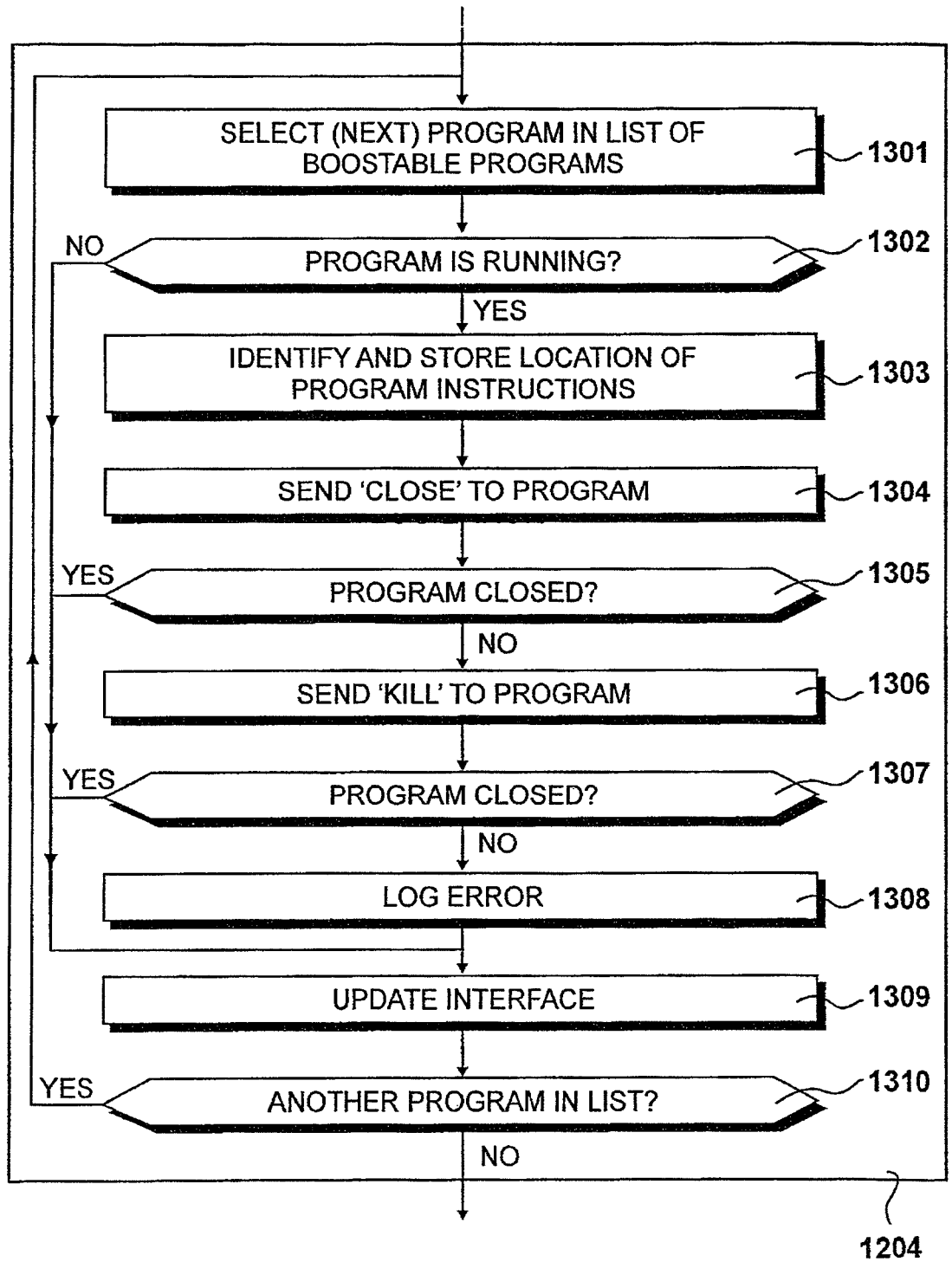
FIG. 13 details steps carried out during FIG. 12 to remove programs from the memory shown in FIG. 5.

At step 1204 the programs on the amended boost list are removed from memory, as will be detailed further in FIG. 13, and at step 1205 a log of errors, if any, is sent to the remote server. This log includes, for example, any programs that could not be closed, and it may be of use to system administrators.

it is envisaged that a user may save a user preference indicating that computer 103 is to boost at boot time. In this alternative embodiment, efficiency application 505 would run early in the boot process and prevent non-essential programs from loading, which would considerably speed up boot time. The user might then restore the computer to a non-boosted state at any time after boot. This embodiment would take account of saved settings regarding which types of programs are to be boosted. For example, the user may wish to retain wireless network card drivers and desktop themes, while preventing other non-essential programs from running.

It is further envisaged that the desktop displayed by the operating system 502, for example explorer.exe run by Windows®, could be considered a non-essential program. During the boost, a different and more suitable desktop would be loaded. For example, if the user is primarily a gamer then a desktop that resembles the display of a gaming console could be loaded, allowing the user to choose games to play in a more familiar environment When computer 103 was restored, the operating system's desktop would be redisplayed.

FIG. 13

FIG. 13 details step 1204 at which programs on the list of boostable programs, created at step 1202, are removed from memory. At step 1301 the first program on the list is selected. At step 1302 a question is asked as to whether that program is actually running on computer 103, since in this embodiment at least some of the list will comprise programs that are not currently running. Even if, as may be the case in other embodiments, the list comprises only programs that are running on computer 103 at the time of the boost, the closure of some programs will cause the closure of others, and therefore it may be that the program is no longer running. Thus if the question is answered in the negative control is directed to step 1309 for selection of the next program.

If the question asked at step 1302 is answered in the affirmative, to the effect that the program is running, then at step 1303 the location of the instructions for the program, ie the executable file, is identified and logged in boost table 511.

At step 1304 a CLOSE command is sent to the program. In many cases this will cause the program to close itself. It will purge its data from memory, possibly including saving it to hard drive, close other programs that it has started, and eventually close itself. However, it does not always work, particularly if a process is awaiting user input or has crashed. A question is therefore asked at step 1305 after a suitable delay as to whether the program has closed, and if not a KILL command is sent at step 1306, which should take the matter out of the hands of the program and cause the operating system to shut it down, removing it and its data from memory. Thus at step 1307 a question is asked, after a suitable delay, as to whether the program has closed, and if not an error is logged at step 1308 in efficiency application data 509.

At this stage, or if the "CLOSE" or "KILL" commands were successful, or following an indication at step 1302 that the program is not running, interface 705 is updated at step 1309 if appropriate. This involves changing the values in counters 707 to 710 and gauge 711, as will be further described with respect to FIG. 14.

At step 1310 a question is asked as to whether there is another program to close, and if this question is answered in the affirmative then Control is then returned to step 1301 and the next program is selected. Alternatively, if the question asked at step 1310 is answered in the negative, then all the boostable programs that are running have been closed, and step 1204 is completed.

Thus at the end of step 1204 all non-essential programs and their data have been removed from memory. Optionally, efficiency application may then monitor the usage of computer 103 and send information back to remote server 128 indicating the applications that are running on computer 103 while the computer is boosted. This information can be useful to the administrators of the system, for example to tailor the application to users of particular types of programs, or to target advertising in banner section 713 to a particular user.

Different operating systems have different commands for closing programs, and therefore the CLOSE and KILL commands may be replaced by one or more other commands. In this embodiment, the CLOSE command is preferred initially because it allows a program to close itself, and may not result in a loss of data. KILL is less tidy and may well lose data.

The steps shown in this figure may more efficiently be carried out by several threads running in parallel, given the requirement to wait and check if a program has closed.

FIG. 14

During the boost process, at step 1309, user interface 705 is updated to reflect changes to the resource usage of computer 103. This also occurs during the restore process, as will be described with respect to FIG. 15. Counters 707 to 710, indicating CPU usage, the memory usage, the number of running services and the number of running processes, respectively, are updated using information available from the operating system 502.

Figure 14:
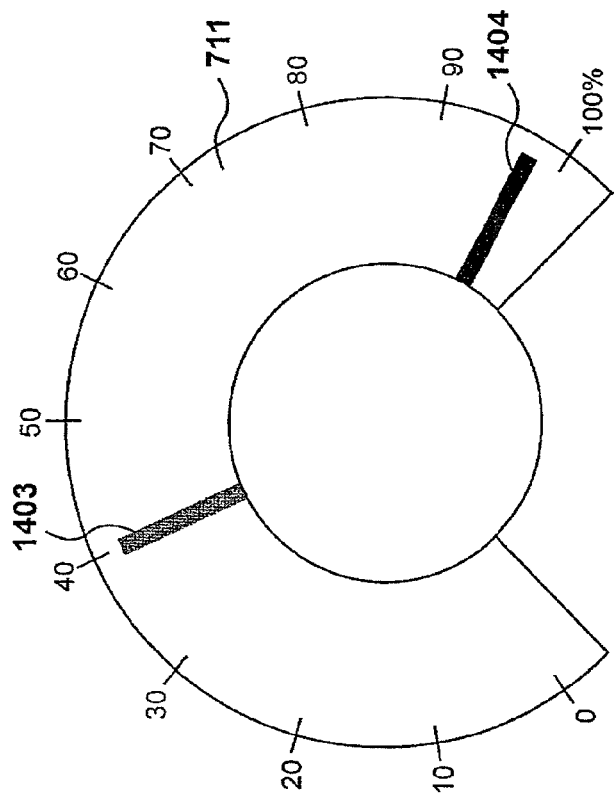
FIG. 14 shows equations used to update a gauge shown in FIG. 7.

In addition, gauge 711 is updated to display the new efficiency indication, and this is illustrated in FIG. 14. When user interface 705 is first displayed, and while computer 103 is restored to its original state by carrying out the steps shown in FIG. 15, an efficiency indication is obtained by carrying out a pre-boost calculation 1401. While a boost is taking place by carrying out the steps shown in FIGS. 12 and 13, an efficiency indication is obtained by carrying out a post-boost calculation 1402. Calculation 1402 is carried out each time a boostable program is closed, and thus the needle can be seen to move during the boost process. Similarly, calculation 1401 is carried out each time a program is reopened, and thus the needle can be seen to move during the restore process. Alternatively, each calculation could be carried out only once, at the end of the boost and restore processes respectively.

Gauge 711 in this example runs from 0 to 100, indicating a percentage boost level. Needle 1403 indicates the result of the post-boost calculation 1402, while a greyed-out needle 1404 indicates the results of a previously carried out pre-boost calculation 1401.

Pre-boost calculation 1401 is defined as the sum of the number of running boostable programs, as given by the number of programs on the list of bootable programs obtained at step 1302, and the number of unknown running programs, divided by the total number of running programs, all subtracted from one. For example, suppose 100 programs are running. 58 of them are on the list of boostable programs, while two of them are not listed in boost table 511. The result of pre-boost calculation 1401 is therefore $1-((58+2)/100)=0.4$. This is displayed as an efficiency indication of 40% on gauge 711, indicating that 60% of the programs running on computer 103 are non-essential.

Post-boost calculation 1402 is defined as the sum of the number of programs on the list of boostable programs that did not not successfully close and the number of unknown running programs, divided by the total number of running programs, all subtracted from one. Following on from the example above, suppose 57 of the 58 boostable programs are successfully closed. The final result of post-boost calculation 1402 is therefore $1-((1+2)/100)=0.97$. This is displayed as an efficiency indication of 97% on gauge 711, indicating that, after the efficiency boost, only 3% of the programs running on computer 103 are non-essential.

Thus if all the boostable programs are successfully closed and there are no unknown programs running, gauge 711 will display an efficiency indication of 100% following an efficiency boost, indicating that no non-essential programs are running on computer 103.

As is clear from the equations shown in FIG. 14, unidentified programs are effectively included in the calculation as un-closeable non-essential programs. This is in order not to overstate the achievement of efficiency application 505 to the user: However, they could equally be included as essential programs, meaning that even when unidentified programs are running, successful closure of all boostable programs would result in gauge 711 showing 100%.

Other equations for measuring the efficiency boost are possible. The method described here only considers the number of running programs. However, it would also be possible to weight the sum of programs by the amount of resources that each program is using, such as memory and CPU.

FIG. 15

Figure 15:
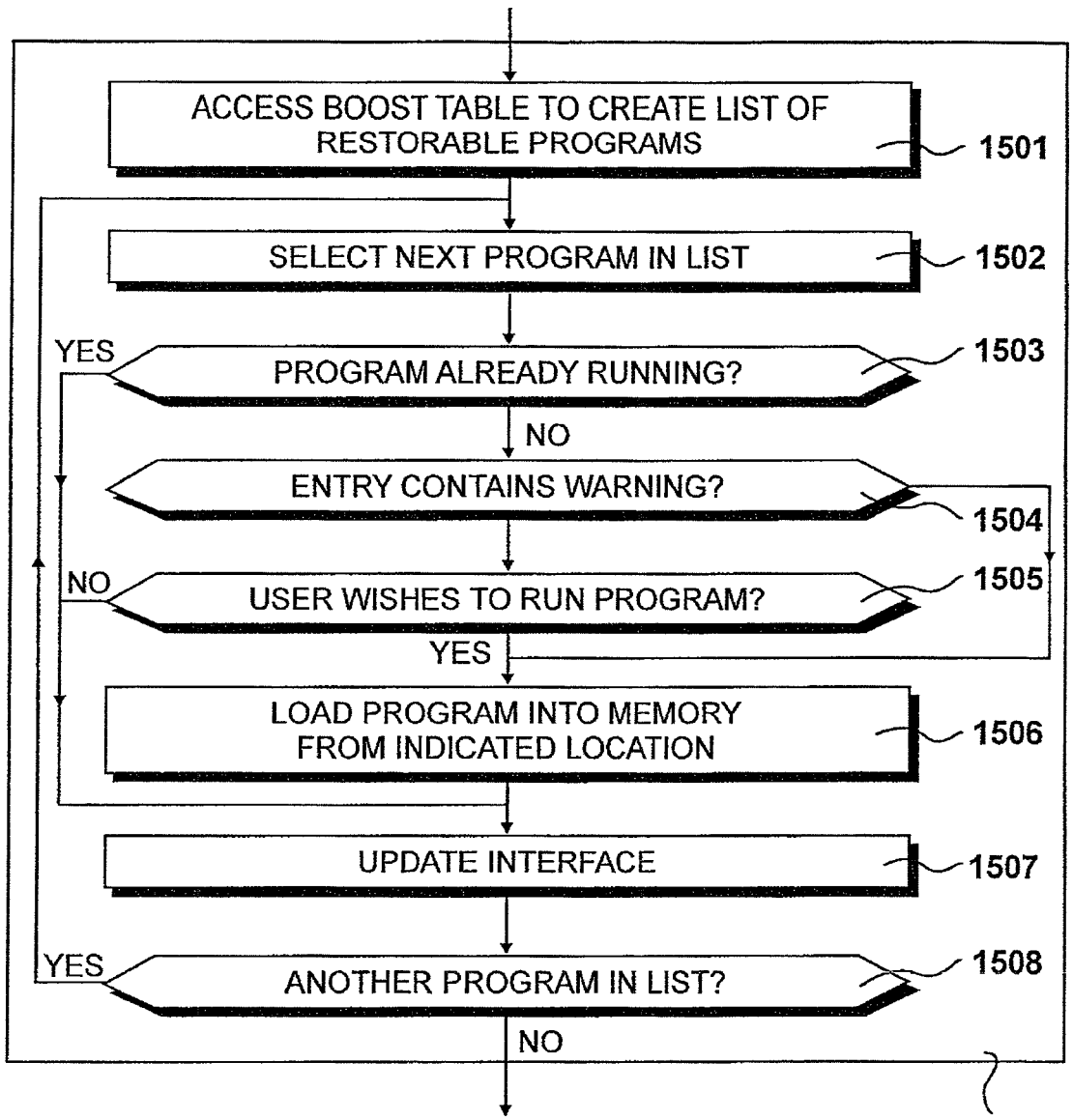
FIG. 15 details steps carried out during FIG. 9 to restart stopped programs.

Step 911, at which stopped programs are restarted, is detailed in FIG. 15. At step 1501 boost table 511, containing the locations of all stopped programs, is accessed to create a list of restorable programs, and at step 1502 the first program in the list is selected. At step 1503 a question is asked as to whether this program is already running. The program may have been started by another program, so if this question is answered in the negative control is forwarded to step 1508 for selection of the next entry.

If the question is answered in the negative then at step 1504 a question is asked as to whether the list contains a warning for this program. This is a piece of information in the boost table, obtained with a boost list from database server 131, indicating that the program may be malicious. If this question is answered in the affirmative then at step 1505 user input is requested as to whether the program should be restarted. If the user gives an answer in the negative, the interface is updated at step 1507 and control is forwarded to step 1508 for selection of the next entry. The user may also be alerted to the existence of suitable antivirus or anti-adware applications that can be obtained for free or purchased.

However, if this question is answered in the affirmative, or if there is no warning for this program, then at step 1506 the program is loaded into memory from the indicated location. A question is then asked at step 1508 as to whether there is another program in the list, and if so control is returned to step 1502 and the next entry is selected. Alternatively, all programs have been reopened and step 911 is completed.

FIG. 16

Figure 16:
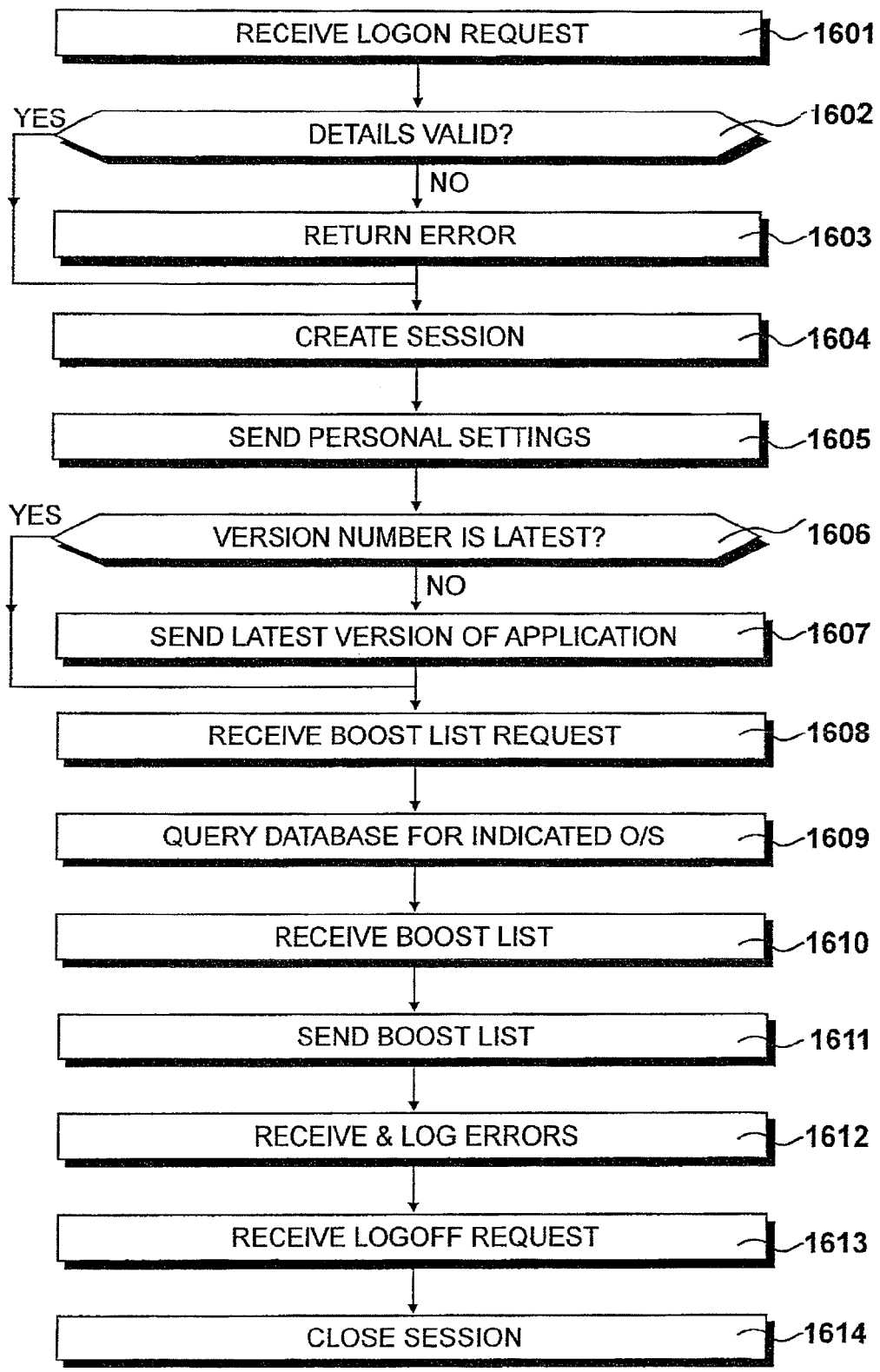
FIG. 16 details steps carried out by a server shown in FIG. 9.

FIG. 16 details steps carried out by the remote server 128, which acts as an intermediary between computer 103 and database server 131. Servers 129 and 130 carry out similar steps. The thread shown in FIG. 14 is carried out for each computer connected to server 128.

At step 1601*a* logon request 601 is received from a computer such as computer 103. At step 1602 a question is asked as to whether the logon details are valid. This step may comprise obtaining user details from database 608. If this question is answered in the negative an error is returned and the process is stopped at step 1603. Another logon request may be received from the same computer but it will be handled by a new instance of the thread. If the logon details are valid, including the case where the user is a guest and no password is required, then at step 1604 a session is created.

At step 1605 personal settings, if any, are obtained from user database 608 and sent to computer 103. At step 1606 a question is asked as to whether the version number indicated by computer 103 is the latest version of the application for the indicated operating system, and if this question is answered in the negative the latest version is sent at step 1607.

At step 1608 a boost list request 603 is received. At step 1609 a data request 604 is sent to database server 131. Database server produces a boost list 606, which server 128 receives at step 1610 and sends, as boost list 607, to computer 103 at step 1611. The computer then uses this to update the local boost table, as detailed in the previous figures.

As previously described, the boost list request may include programs that are running on computer 103 but do not appear on that computer's local boost table 511. Thus the data request 604 comprises a request for the status of the listed programs, and any further information on them that may be available and relevant. For example, a program may be considered malicious. Data request 604 also includes an identification of the user.

If a boost list request includes a program that is not listed in database 605 it is reported to system administrators and will be added to the database. If a large number of computers report a new program in a short space of time, it is possible that that program may be malicious, such as viral software or malware. It is therefore possible that the invention herein described may provide an early warning of malicious programs.

Data request 604 additionally prompts a query to be run on user database 608 to check whether any flags have been set for program status changes. Periodically, the status of a program may be changed from essential to non-essential, or vice versa. A query can then be run to flag any users that have ever requested the status of that program. When the user next sends a boost request, the updated status of the program can be returned in a boost list and the flag removed.

Thus, if efficiency application 505 does not identify any unknown programs, an empty boost list request is sent to server 128, and a data request is still sent to database server 131, in case any status updates need to be returned.

At step 1612 a log of errors may be received, indicating for example programs that were hard to close. Programs running on a computer that are not in database 608 can therefore be flagged to administrators. This enables administrators to keep the programs database up to date.

If another boost list request is received, steps 1608 to 1612 are repeated. Alternatively, at step 1613 a logoff request is received and at step 1614 the session is closed. A session may also be closed after a set period of time, known as a timeout.

The invention claimed is:

1. Apparatus comprising a processor, memory and local storage, wherein a plurality of sets of instructions, each corresponding to one of a plurality of programs, is stored in said local storage and said processor is configured to:
   load said sets of instructions from said storage into said memory;
   receive a first user command to close non-essential programs;
   identify a first program as non-essential, said first program having a first set of instructions corresponding to it;
   store, as a first indication, an indication of the location within said local storage of said first set of instructions;
   close said first program and remove its corresponding set of instructions from said memory;
   receive a second user command to re-open non-essential programs;
   retrieve said first indication; and
   reload said first set of instructions into said memory from the location in said local storage indicated by said first indication.

2. Apparatus according to claim 1, wherein said apparatus includes a manual input and said first command is a first user command received via said manual input.

3. Apparatus according to claim 2, wherein said processor second command is a second user command received via said manual input.

4. Apparatus according claim 1, wherein said processor is configured to:
   store a list of non-essential programs in said storage, and
   identify said first program as non-essential by accessing said list.

5. Apparatus according to claim 4, wherein said processor further includes a network connection and is configured to communicate with a remote server via said network connection, and is further configured to obtain updates to said list from said remote server and apply said updates to said list.

6. Apparatus according to claim 5, wherein said processor is configured to obtain updates to said list by:
   identifying a set of said plurality of programs that do not appear on said list and classifying them as unknown programs;
   communicating an indication of said unknown programs to said remote server; and
   for each of said unknown programs, receiving an indication from said remote server that it is either non-essential or essential.

7. Apparatus according to claim 1, wherein said processor further includes a network connection and is configured to communicate with a remote server via said network connection, and is configured to identify said first program as non-essential by:
   obtaining a list of non-essential programs from said server; and
   identifying a condition to the effect that said first program appears on said list.

8. Apparatus according to claim 1, wherein said processor further includes a network connection and is configured to communicate with a remote server via said network connection, and is configured to identify said first program as non-essential by:
   creating a first list comprising said plurality of programs;
   sending said first list to said server; and
   receiving a second list of nonessential programs from said server, wherein said second list is a subset of said first list and comprises said first program.

9. Apparatus according to claim 1 wherein said processor is configured to identify, close and reload a plurality of non-essential programs.

10. Apparatus as claimed in claim 1, wherein said processor is further configured to, before said first user command is received:
    identify how many programs are running and thereby calculate a first variable;
    identify how many of said running programs are non-essential and thereby calculate a second variable;
    calculate an efficiency indication in dependence upon said first and second variables; and
    display said efficiency indication on said display.

11. Apparatus according to claim 10, wherein said first variable is additionally calculated in dependence upon the amount of resources taken up by each of the running programs, and said second variable is additionally calculated in dependence upon the amount of resources taken up by each of the non-essential programs.

12. Apparatus according to claim 10, wherein said processor is further configured to, after closing said non-essential programs:
- identify how many of said non-essential programs failed to close and thereby calculate a third variable;
- calculate a further efficiency indication in dependence upon said first and third variables; and
- display said further efficiency indication on said display.

13. Apparatus comprising a processor, memory, local storage and a network connection, wherein a plurality of sets of instructions, each corresponding to one of a plurality of programs, is stored in said storage and said processor is configured to:
- load said sets of instructions from said local storage into said memory;
- communicate with a remote server via said network connection to obtain an indication of non-essential programs;
- receive a first user command to close non-essential programs;
- identify a first program as non-essential, said first program having a first set of instructions corresponding to it;
- store, as a first indication, an indication of the location within said local storage of said first set of instructions;
- close said first program and remove its corresponding set of instructions from said memory;
- receive a second user command to re-open non-essential programs; and
- retrieve said first indication; and
- reload said first set of instructions into said memory from the location in said local storage indicated by said first indication.

14. A method of temporarily freeing up resources in a computer, comprising the steps of:
- loading a plurality of sets of instructions from local storage into memory, thereby starting a plurality of corresponding programs;
- receiving a user command to close non-essential programs;
- identifying a first program as nonessential, said first program having a first set of instructions corresponding to it;
- storing, as a first indication, an indication of the location within said local storage of said first set of instructions;
- closing said first program and removing its corresponding set of instructions from memory;
- receiving a second user command to re-open non-essential programs;
- retrieving said first indication; and
- reloading said first set of instructions into said memory from the location in said local storage indicated by said first indication.

15. A method according to claim 14, further including the step of maintaining a list of non-essential programs, wherein said step of identifying a first program as nonessential comprises the step of accessing said list.

16. A method according to claim 15, further including the step of obtaining updates to said list from a remote server.

17. A method according to claim 16, wherein said step of obtaining updates to said list comprises the steps of:
- identifying a set of said plurality of programs that do not appear on said list and classifying them as unknown programs;
- communicating an indication of said unknown programs to said remote server; and
- for each of said unknown programs, receiving an indication from said remote server that it is either non-essential or essential.

18. A method according to claim 14, wherein said step of obtaining an indication identifying said first program as non-essential comprises the steps of:
- obtaining a list of non-essential programs from a remote server; and
- identifying a condition to the effect that said first program appears on said list.

19. A method according to claim 14, wherein said step of obtaining an indication identifying said first program as non-essential comprises the steps of:
- creating a first list comprising said plurality of programs;
- sending said first list to a remote server; and
- receiving a second list of nonessential programs from said server, wherein said second list is a subset of said first list and comprises said first program.

20. A method according to claim 14 wherein a plurality of non-essential programs are identified, closed and reloaded.

21. A non-transitory computer-readable medium having computer-readable instructions executable by a computer such that, when executing said instructions, a computer will perform the following steps:
- storing a plurality of sets of instructions, each corresponding to one of a plurality of programs, in local storage;
- loading said sets of instructions from storage into memory;
- receiving a first user command to close non-essential programs;
- identifying a first program as non-essential, said first program having a first set of instructions corresponding to it;
- storing, as a first indication, an indication of the location within said local storage of said first set of instructions;
- closing said first program and removing its corresponding set of instructions from said memory;
- receiving a second user command to re-open non-essential programs;
- retrieving said first indication; and
- reloading said first set of instructions into said memory from the location in said local storage indicated by said first indication.

* * * * *